April 14, 1936.  W. R. McGOWEN  2,037,333

GLIDER

Filed July 19, 1934  2 Sheets-Sheet 1

INVENTOR
William R. McGowen,
By Archworth Martin,
Attorney.

April 14, 1936.   W. R. McGOWEN   2,037,333
GLIDER
Filed July 19, 1934   2 Sheets-Sheet 2
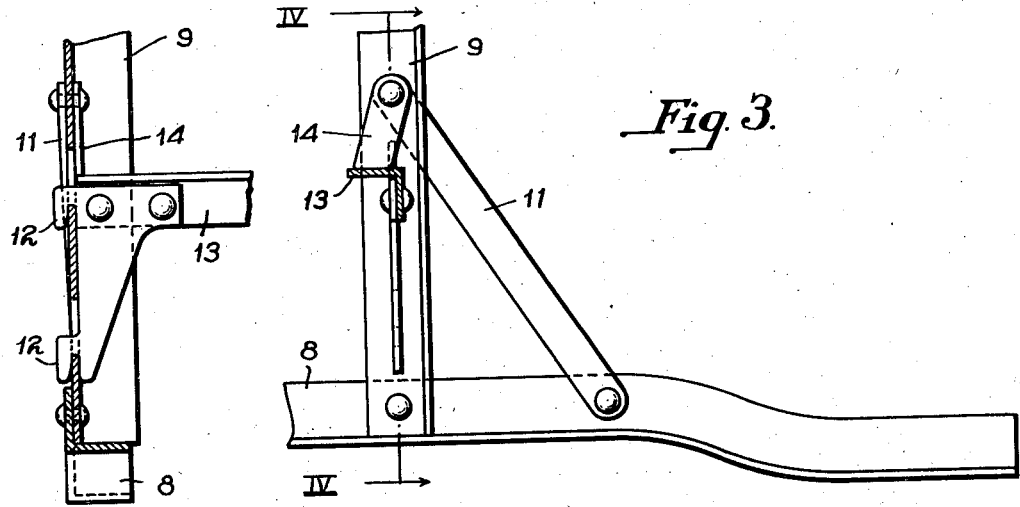
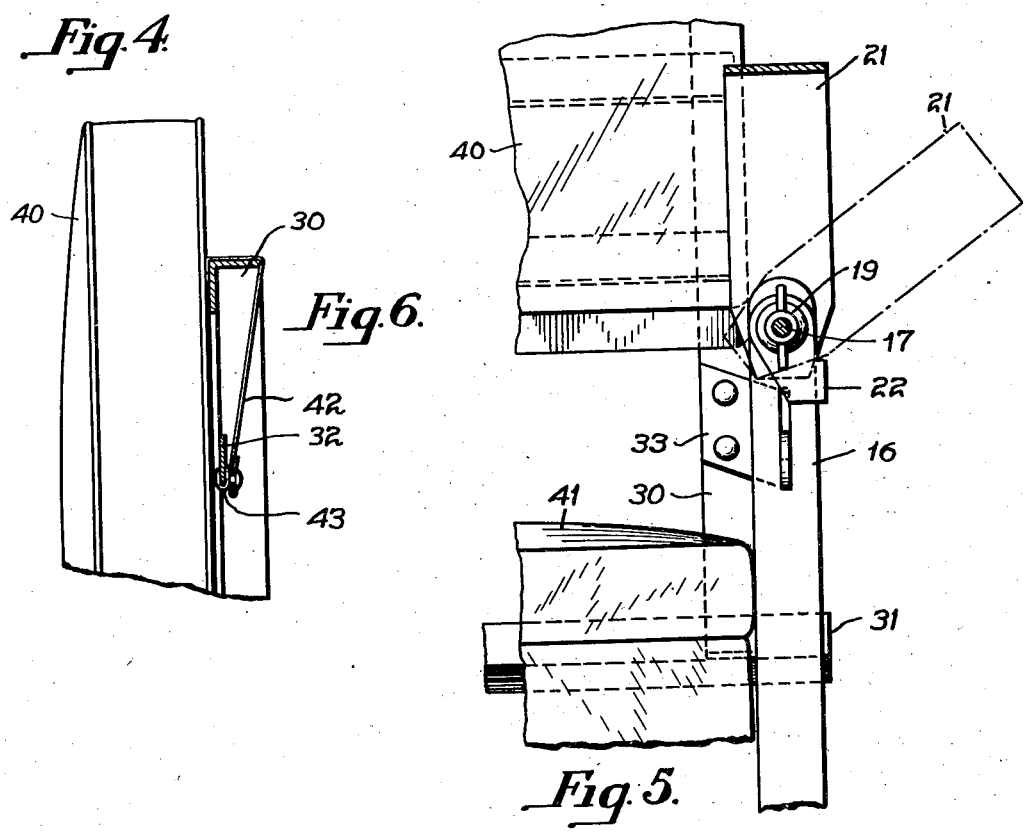
INVENTOR
William R. McGowen,
By Archworth Martin,
Attorney.

Patented Apr. 14, 1936

2,037,333

UNITED STATES PATENT OFFICE 2,037,333

GLIDER

William R. McGowen, Pittsburgh, Pa., assignor to The McKay Company, Pittsburgh, Pa., a corporation of Pennsylvania Application July 19, 1934, Serial No. 736,033

2 Claims. (Cl. 5—124)

My invention relates to gliders and more particularly to those of the swinging type.

One object of my invention is to provide a swing or glider of such form that in addition to the horizontal movement ordinarily present in structures of this kind, there is present also a rocking movement.

Another object of my invention is to provide a structure of the character referred to which is free of vibrations and swaying movements, such as are frequently found in swings and gliders of various types.

Another object of my invention is to provide a structure having arm rests that can be readily turned toward a horizontal position, in order to adapt the glider to use as a couch.

Still another object of my invention is to provide a glider swing wherein the various parts can be conveniently assembled and disassembled, for packing and transporting.

Figure 1:
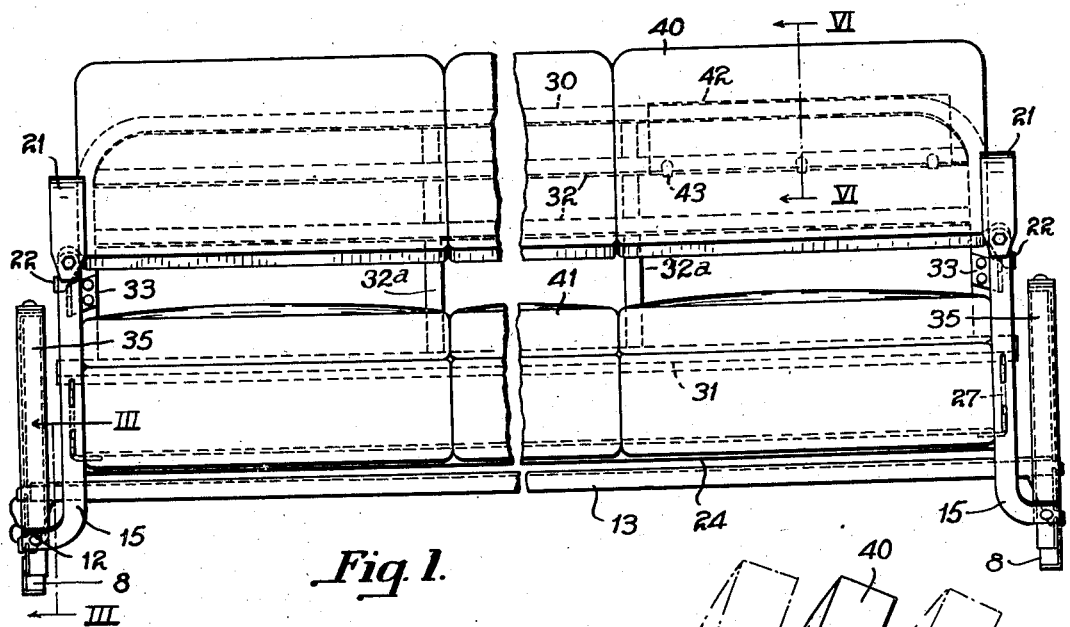
Figure 2:
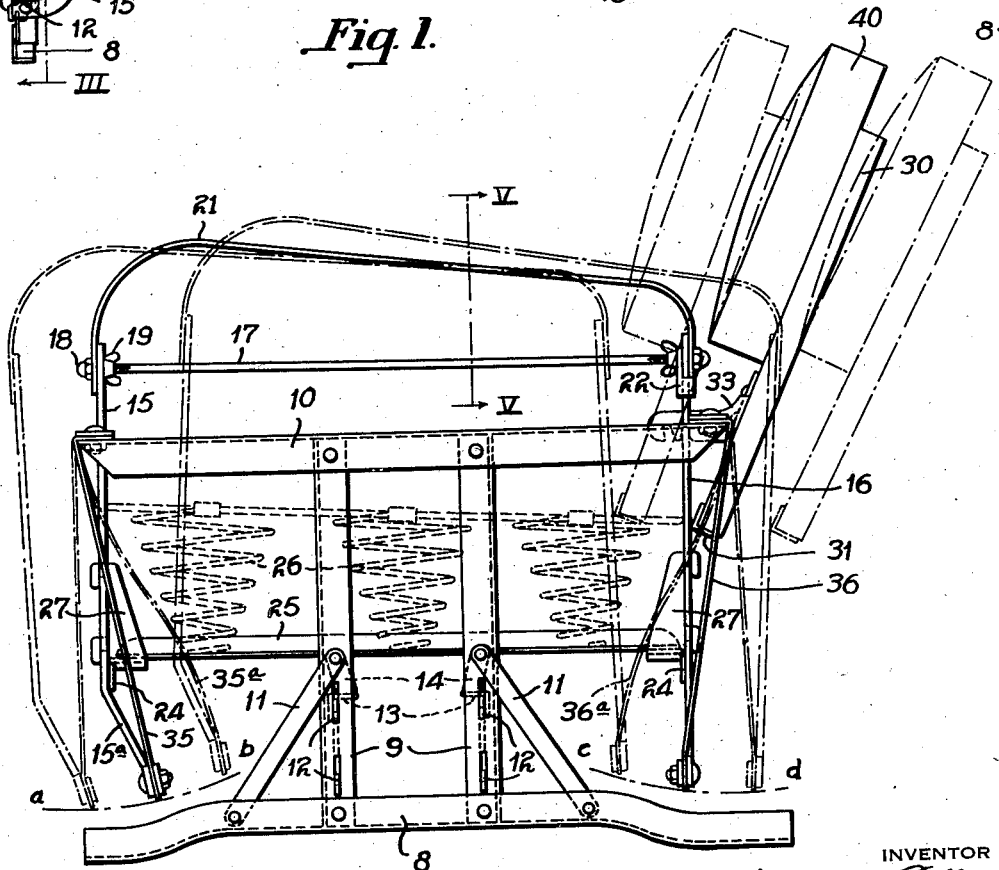

One form which my invention may take is shown in the accompanying drawings wherein Figure 1 is a fragmentary front elevational view of the structure; Fig. 2 is an end elevational view thereof; Fig. 3 is an enlarged view taken on the line III—III of Fig. 1; Fig. 4 is a view taken on the line IV—IV of Fig. 3; Fig. 5 is an enlarged view taken on the line V—V of Fig. 2, and Fig. 6 is an enlarged view taken on the line VI—VI of Fig. 1.

The structure comprises stationary end frames suitably connected, and a movable seat frame that is flexibly suspended from the stationary end frames, as hereinafter described.

Each of the two stationary end frames includes a floor bar 8 and uprights 9 connected to and supporting a top rail 10. Bars 11 are connected at their ends to the uprights 9 and the floor bar respectively, to rigidly support said uprights. Each of the uprights 9 has a pair of slots for the reception of a pair of hooks 12 that are provided on the ends of each of a pair of cross sills 13. It will be seen that when the cross sills 12 are hooked into the uprights 9 at each end of the glider structure, the end frames are held in rigidly assembled position. Pivoted latches or cams 14 are provided for preventing accidental displacement of the cross rails 13 from the uprights 9.

The movable or seat portion of the structure includes movable end frame members each composed of a vertically-extending front bar 15, a vertically extending rear bar 16, and a cross bar 17, the ends of the bars 17 being threaded for the reception of cap nuts 18 and wing nuts 19, whereby the parts are held in assembled relation. The ends of the rod 17 extend also through the down-turned ends of an arm rest 21, the arm rest being normally held in upright position, as shown in Fig. 2, by the clamping effect of the wing nuts 19. Either of the arm rests can be turned from its upright position to the inclined position shown in Fig. 5, by loosening the wing nuts 19. A pillow can then be laid against the inclined arm rest for the convenience of a person who wishes to employ the glider as a couch. A stop member 22 is carried by the rod 17 at each end of the glider, the stop members being provided with abutments for limiting outward swinging movement of the arm rests, with which they are respectively associated.

A spring bottom or seat frame is composed of longitudinally-extending rails 24 to which are secured cross rails 25 that support the usual coil springs 26. Hook members 27 are secured to the rails 24 at each end of the structure, and the hooks of said members extend through suitable openings in the vertical bars 15 and 16, thus securely locking the seat frame to the movable end frames.

The seat back includes a frame composed of an angle 30 bent to inverted U-form, the down-turned ends whereof are connected by a longitudinally-extending angle bar 31 whose ends extend beyond the down-turned ends of the angle 30, so that they will abut against the rear sides of the uprights 16, as shown more clearly in Figs. 2 and 5. Stiffening or bracing bars 32 are secured at their ends to the bar 30, and are also joined by bars 32a to the bars 30 and 31.

Hook members 33 are connected to the vertically-extending portions of the bar 30 and extend through slots in the upright bar 16. The hook members 33 not only afford vertical support for the back frame, but have toothed or hook portions that are brought into engagement with the lower walls of the slots to vary the degree of inclination of the seat back, the lower bar 31 of the back frame, of course, rocking on the rear sides of the vertical bars 16, during tilting of the back frame.

The lower ends of the vertical bars 15 are bent into the plane of the stationary end frames, as shown more clearly in Fig. 1, and are also bent backwardly, as shown at 15a in Fig. 2. Suspending strips 35 of spring steel or the like are connected at their upper and lower ends to the top rails 10 and the extensions 15a of the vertical bars 15, respectively, the suspension members 35 being so shaped that they tend to occupy the inclined position shown in Fig. 2. The rear bars 16 of the movable end frames are bent laterally at their lower ends into the plane of the stationary end frames, but are otherwise vertical instead of having the additional bend shown at 15a. Spring strips 36 are connected to the lower out-turned ends of the bars 16 and to the top rails 10, and are so formed as to normally occupy the position shown in Fig. 2.

The strips 35 and 36 may be suitably made of strips of spring steel or the like of substantially equal length, and function to resist end sway, and to permit of a gentle gliding motion, as described in my Patent No. 1,959,032, issued May 15, 1934. In said patent, however, the normal position of said strips is vertical, whereas in the present instance, they are inclined downwardly in directions toward each other, as shown in Fig. 2. The inherent stiffness of the suspension strips 35 and 36 cause them to normally remain in substantially the position shown in Fig. 2, as above-stated, even though the weight on the seat is not evenly distributed.

When chains or the like are employed instead of the spring strips, a slightly uneven distribution of the weight on the seat causes the seat to occupy a position toward one of the dotted line positions shown in Fig. 2, but rocking movement of the glider in addition to swinging movement, is effected because of the particular manner of connecting the chains to the seat frames and the end frames, as above-described.

With the seat in the full line position of Fig. 2, motion imparted thereto will cause it to swing back and forth between and perhaps past the two dotted line positions, through arcs indicated by the lines a—b and c—d. On the rearward movements from the full line position, it will be seen that the front edge of the seat will rise and the rear edge thereof descend somewhat, whereas on the forward movement, the front edge of the seat will descend and the rear edge thereof rise somewhat, thus producing a rocking effect in addition to the ordinary gliding motion. The rocking effect is enhanced near the ends of the path of swinging movement by the bending of the springs in reverse directions, as indicated by the dotted lines 35a and 36a, thereby shortening the radial length of the springs. Thus at 35a, the natural rise of the lower end of the legs 15 as they approach the points b, by reason of their arcuate paths is increased by the flexing and consequent shortening effect produced in the spring strips 35. A similar result occurs at 36a as the spring approaches the point c.

It will be seen that the length of the rails 10 is greater than the width of the seat frame at the lower ends of the bars 15 and 16, so that when the suspending members 35 and 36 are attached to the ends of the top rails 10 and the ends of the bars 15 and 16 they will assume an inwardly-inclined position. Consequently, when the seat is moved forwardly and rearwardly, it is rocked in directions counter to its normal swinging movements.

Cushions 40 are carried by the back frame in vertically-spaced relation to seat cushions 41, so that freer circulation of air past a sitter is effected during swinging movement. Each cushion 40 has a flexible flap 42 attached to its rear side which is passed over the frame bar 30. Hooks 43 are attached to the lower end of the flaps 42 and the hooks are hooked onto the lower side of the cross bars 32, to retain the back cushion in position.

I claim as my invention:—

1. A glider comprising a pair of stationary end frames each having a vertically-supported top rail, a seat frame disposed between the end frames and having vertically-extending corner bars, one of said corner bars at each end of the seat frame being bent toward the other corner bar, and spring-strip suspending members connected to the outer ends of said top rail and to the said lower ends of the vertical bars, the suspending members being relatively inclined with their lower ends closer together than their upper ends, and so mounted and formed as to yieldably resist deflection from their normal inclined positions of rest.

2. A glider comprising a pair of stationary end frames each having a vertically-supported top rail, a seat frame disposed between the end frames and having vertically-extending corner bars, the lower extremities of the front corner bars at each end of the seat frame being bent backwardly, and spring strip suspending members connected to the outer ends of said top rail and to the said lower ends of the vertical bars, the suspending members being relatively inclined with their lower ends closer together than their upper ends, and so mounted and formed as to yieldably resist deflection from their normal inclined positions of rest.

WILLIAM R. McGOWEN.